United States Patent [19]

Shirai et al.

[11] 4,442,461

[45] Apr. 10, 1984

[54] SIGNAL RECORDING AND/OR REPRODUCING TECHNIQUE

[75] Inventors: Hidemichi Shirai, Tokyo; Kenji Nakano, Ebina; Hisayoshi Moriwaki, Tokyo, all of Japan

[73] Assignee: Sony Corporation, Tokyo, Japan

[21] Appl. No.: 316,328

[22] Filed: Oct. 29, 1981

[30] Foreign Application Priority Data

Oct. 31, 1980 [JP] Japan ................................ 55-154128

[51] Int. Cl.³ .......................... H04N 7/04; H04N 5/76
[52] U.S. Cl. .................................... 358/343; 358/145; 360/19.1
[58] Field of Search ............... 358/143, 145, 310, 335, 358/319, 343, 339; 360/19.1, 32, 37.1, 33.1

[56] References Cited

U.S. PATENT DOCUMENTS 3,335,218  8/1967  Johnson .............................. 360/19.1
4,246,615  1/1981  Shiaishi et al. .................. 360/19.1 X

*Primary Examiner*—Robert L. Richardson
*Attorney, Agent, or Firm*—Lewis H. Eslinger; Alvin Sinderbrand

[57] ABSTRACT

A video signal is recorded with the associated audio signal inserted as a PCM digital signal in the back porch portions of the horizontal blanking intervals. In order to prevent the video pre-emphasis that is used in high-density recording from degrading the PCM digital signal, the video signal and the PCM digital signal are provided with separate and independent degrees of pre-emphasis. Upon playback, the video signal and the PCM digital signal are provided with corresponding independent respective amounts for de-emphasis. In order to fit a sufficient number of bits into the blanking intervals to provide high quality audio, the back porch portion is first extended by replacing the standard horizontal synch pulses with narrow pulses, so that the following back porch portions are correspondingly elongated.

19 Claims, 24 Drawing Figures

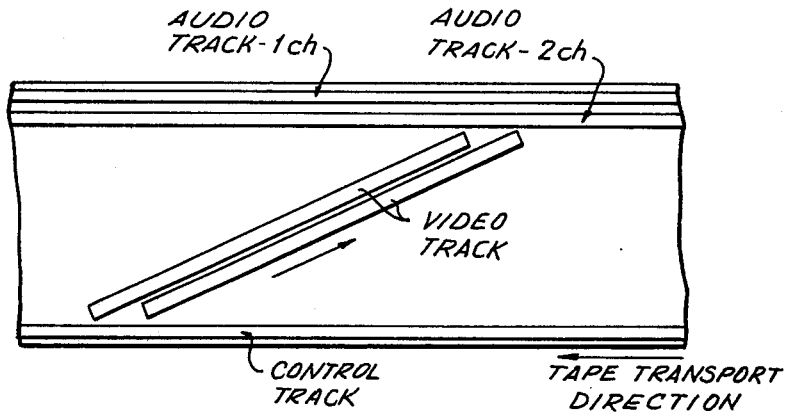
FIG. 1
PRIOR ART
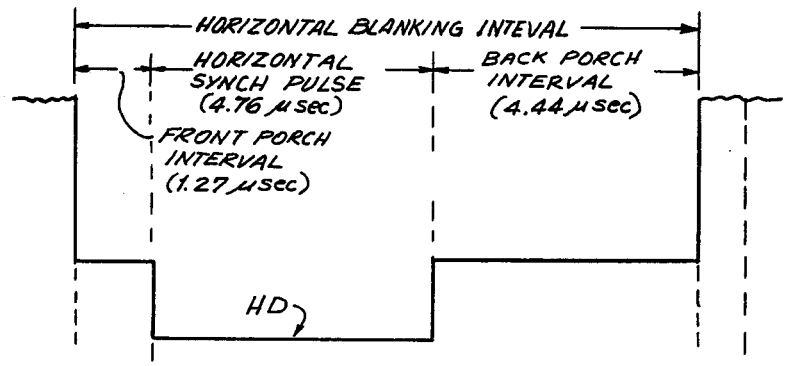
FIG. 2A
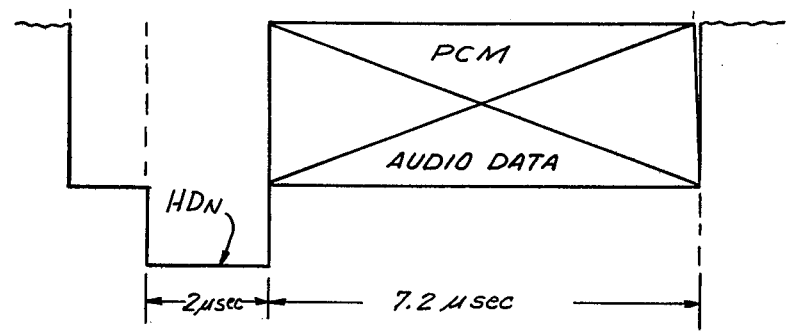
FIG. 2B
FIG. 2C

FIG.4A (HDN)
FIG.4B (SPL)
FIG.4C (SPR)
FIG.4D (SLR)
FIG.4E (SRW)
FIG.4F (SIO)

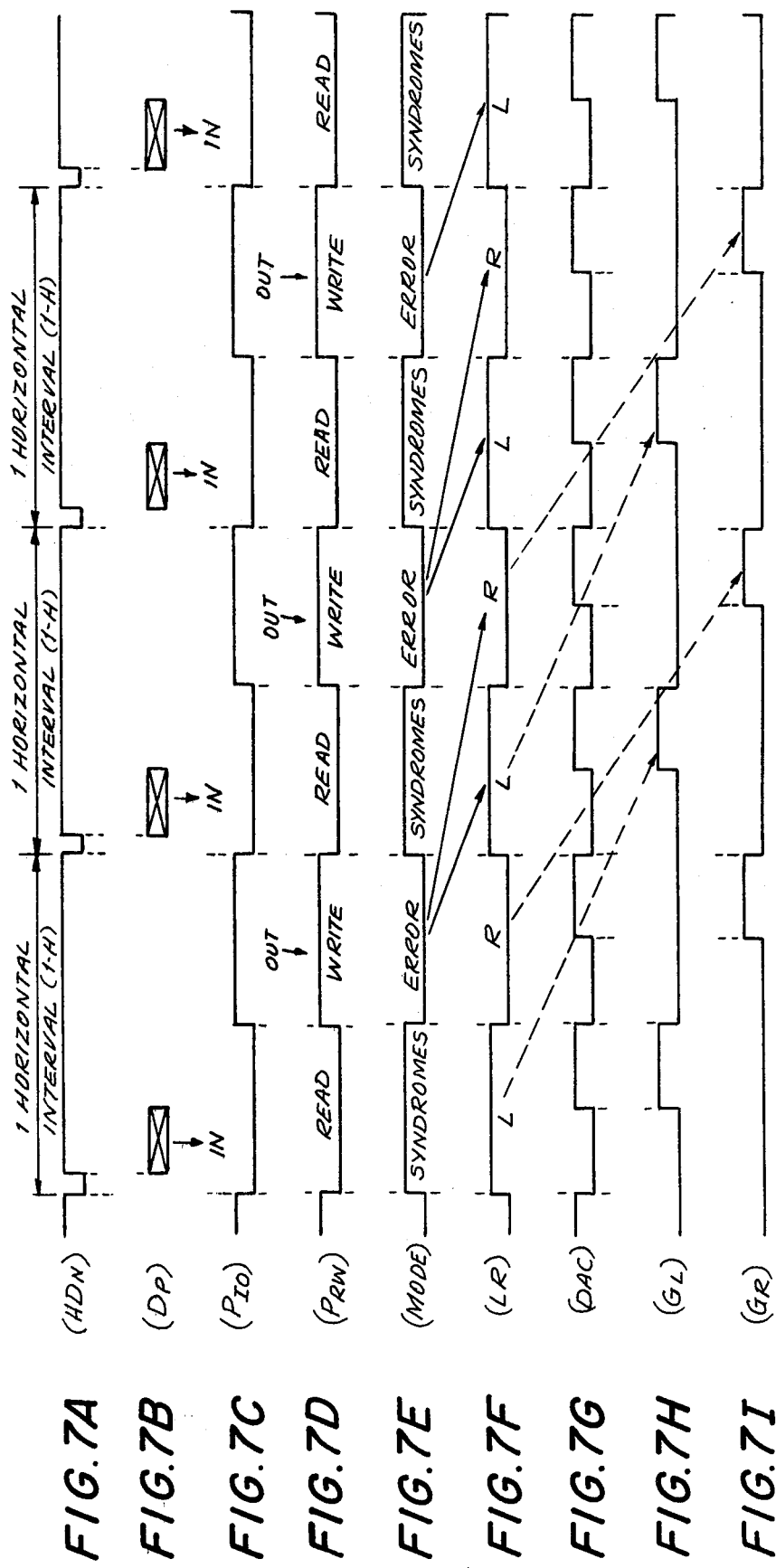

SIGNAL RECORDING AND/OR REPRODUCING TECHNIQUE

BACKGROUND OF THE INVENTION

1. Field of the Invention

This invention relates to method and apparatus for recording a video signal and/or reproducing the video signal so recorded. The invention is more particularly directed to the recording and/or reproducing of a video signal in which a digital information signal, such as a digital version of the audio portion accompanying the video signal, is recorded in a portion of blanking intervals of the video signal. The invention is also directed to a record carrier, such as magnetic tape, on which the video signal is so recorded.

2. Brief Description of the Prior Art

Conventional recording of a video signal and an associated audio signal on tape using a video tape recorder (VTR) involves recording the video signal with a rotary head in a sequence of parallel tracks in an oblique angle to the direction of tape transport, and recording the associated audio signal with one or more fixed heads in one or more longitudinal tracks in the direction of tape transport. Upon playback, the rotary head scans the video track to produce a reproduced video signal while the fixed heads pick up the recorded audio signal.

Home-use VTRs have recently been improved for high density recording to permit long play. That is, recording techniques for home-use VTRs have permitted slow tape speed to be used so that several hours of video programming can be recorded on a single video cassette. More particularly in long play recording, many home-use VTRs have a tape transport speed of only one or two centimeters per second.

Unfortunately, when the tape transport speed is low, as it is during long play recording and playback, the audio tracks are also drawn past the fixed heads at low speed, and the recorded and played back audio signal can lack satisfactory frequency and signal-to-noise characteristics.

In order to avoid this drawback, it is possible to record the audio signal in the oblique video tracks, for example by converting the audio signal to a pulse-code modulated (PCM) digital signal and inserting this PCM signal into horizontal blanking intervals of the video signal.

In high-density recording of a video signal, in order to achieve a satisfactory signal-to-noise ratio in the reproduced video signal, pre-emphasis is applied to the video signal upon recording and corresponding de-emphasis is applied thereto upon playback. However, the amount of pre-emphasis needed for the video signal to achieve an optimum signal-to-noise ratio is not necessarily compatible with the associated PCM signal. For example, in order to achieve optimum picture quality, a pre-emphasis of several tens of dB is applied in the vicinity of 2 MHz, as compared with lower frequencies. However, such strong pre-emphasis can impart a severe phase change to the PCM signal which cannot be corrected by a corresponding de-emphasis during playback. Thus, when subjected to this pre-emphasis and de-emphasis, the PCM signal will become so distorted that the audio information cannot be accurately extracted during playback.

OBJECTS AND SUMMARY OF THE INVENTION

Accordingly, it is an object of this invention to provide a method and apparatus for recording and/or reproducing a video signal in which the foreging drawbacks are avoided.

It is a more specific object of this invention to provide a method and apparatus with which a digital information signal, such as a PCM audio signal, is inserted into portions of the horizontal blanking intervals of a video signal, and in which during recording the video signal and the digital information signal are provided independently with pre-emphasis, and during playback the video signal and the digital information signal are provided independently with corresponding de-emphasis.

In accordance with an aspect of this invention, a video signal containing regularly spaced blanking intervals alternating with video information intervals containing video information has pulse code modulated digital information inserted into a portion of each of the blanking intervals. The video information is provided with one amount of pre-emphasis selected to obtain an optimum signal-to-noise ratio upon playback, while the digital information is provided with another, independent amount of pre-emphasis to achieve an optimum signal-to-noise ratio thereof on playback but without introducing any uncorrectable phase distortion. The pre-emphasized digital information is inserted into portions, such as the back porches, of the blanking intervals, and the resulting signal is placed on a carrier, as by recording on a magnetic medium. In order to accommodate a sufficient number of bits of the digital information signal, the standard synchronizing pulse (e.g., 4.76 $\mu$sec) and standard back porch interval (e.g., 4.44 $\mu$sec) of the blanking interval are replaced by a foreshortened synchronizing pulse (e.g., 2 $\mu$sec) and an elongated back porch interval (e.g., 7.2 $\mu$sec). During reproduction, the recorded signal is picked up, the digital information signal is separated from the video information, and each of the digital information signal and the video information is subjected to a respective amount of de-emphasis.

A high quality stereo signal can be recorded according to this invention by sampling each of left and right channels during a horizontal scanning interval, forming first and second digital words corresponding to the samples of the left and right channels, and forming for use as the recorded digital information signal an error correcting block formed of the first and second words and an associated error correction check word. An interleaving technique can be used to protect against burst errors in the digital signal.

These and other objects, features, and advantages of this invention will become apparent from the ensuing description of a preferred embodiment which is to be considered in conjunction with the accompanying drawings.

BRIEF DESCRIPTION OF THE DRAWINGS

FIG. 1 is a schematic plan view illustrating a conventional track pattern of a magnetic tape in which an audio signal is recorded in a longitudinal track.

FIGS. 2A to 2C show waveforms associated with the method of this invention.

FIGS. 4A to 4G show waveforms for explaining the operation of the apparatus of FIG. 3.

FIGS. 7A to 7I show waveforms for explaining the operation of the apparatus of FIG. 6.

DETAILED DESCRIPTION OF A PREFERRED EMBODIMENT

With reference to the drawings, and initially to FIG. 1 thereof when a video signal and an associated audio signal are recorded on a conventional VTR, a rotary head records the video signal in a sequence of parallel slant tracks while a fixed head records the audio signal in a longitudinal track parallel to the direction of tape transport. In the example shown in FIG. 1, first and second channels of a two-channel stereophonic audio signal are recorded in separate longitudinal tracks near an upper edge of the tape. Control signals are recorded in a control track disposed near a lower edge of the tape.

As mentioned previously, where tape transport speed is extremely low, for example, in high-density long-play recording using a home-use VTR, the quality of the audio signal recorded in the longitudinal audio tracks suffers greatly, and sound with good tone quality cannot be reproduced from the tape.

To avoid this problem, it is proposed to record the audio signal as a pulse code modulated (PCM) digital signal superimposed on the video signal. However, if this is to be carried out, care must be taken so that processing of the video signal, such as pre-emphasizing the same, does not destroy the PCM digital audio signal.

In the technique of this invention, it is convenient to insert the PCM digital audio signal into the back porch portion of the horizontal blanking intervals of the luminance signal, as explained with reference to FIGS. 2A to 2C.

In a standard NTSC television broadcast system (hereinafter simply referred to as the standard system), as shown in FIG. 2A, the horizontal blanking interval has a width of 10.47 $\mu$sec, a synchronizing pulse HD of 4.76 $\mu$sec, and a back porch of 4.44 $\mu$sec. While it is preferred to insert the PCM digital audio signal on the back porch, the 4.44 $\mu$sec period thereof is too short to hold enough bits for recording and playback of a reliable high-quality audio signal. Therefore, the horizontal blanking interval is modified as shown in FIG. 2B.

In order to accomodate a sufficient number of PCM bits, the horizontal synchronizing pulse HD is replaced by a foreshortened synchronizing pulse, here of 2 $\mu$sec. Accordingly, the back porch is extended to a width of 7.2 $\mu$sec which is wide enough to accomodate PCM data of 31 bits, as shown in FIG. 2C. Thus, in the embodiment of the invention described herein, the PCM digital audio signal is superimposed on these extended back porch portions, and recorded in the slant tracks.

Figure 3:
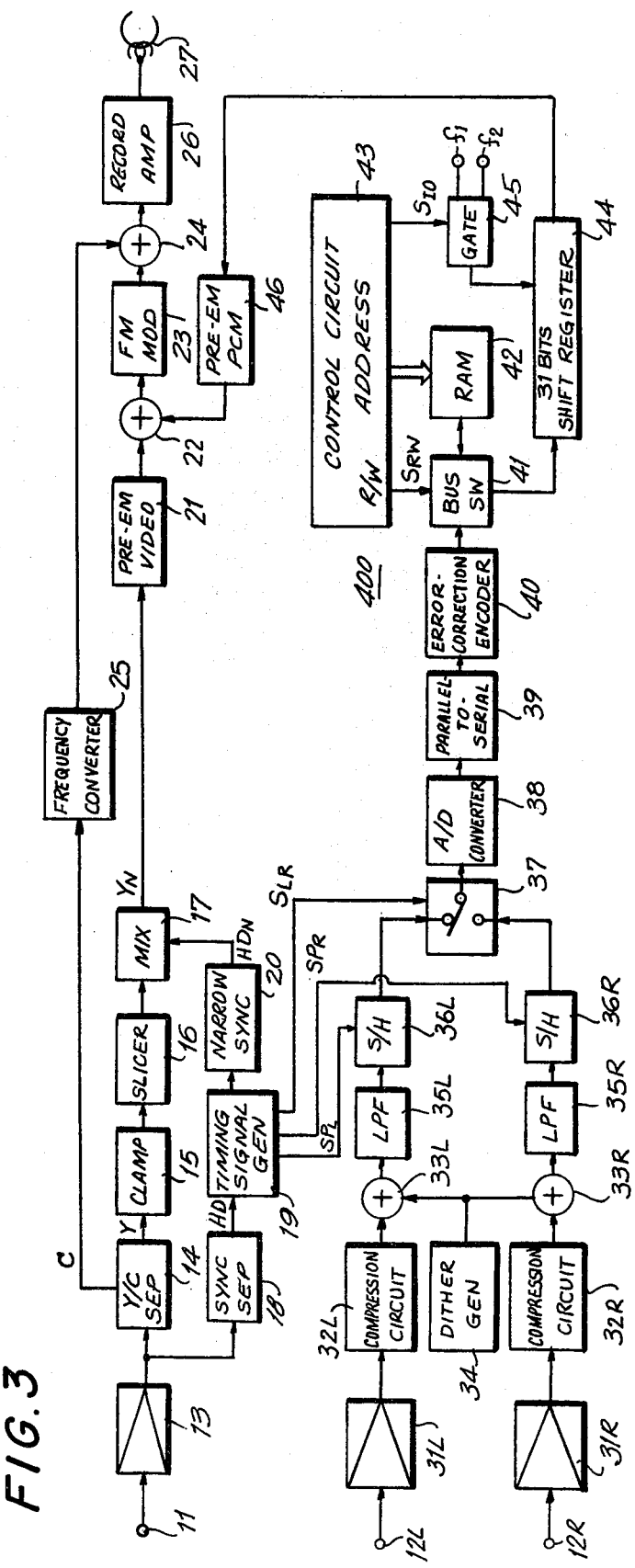
FIG. 3 is a schematic block diagram illustrating one embodiment of recording apparatus according to this invention.

An embodiment of apparatus for recording the video and audio signals according to this invention is illustrated in FIG. 3.

In this apparatus, a color video signal is applied to a video input terminal 11, while left- and right-channel audio signals are applied respectively to left and right channel audio terminals 12L and 12R.

The color video signal proceeds from the input terminal 11 through a video amplifier 13 to a luminance/chrominance separator 14. The latter provides a separated luminance signal Y to a clamp circuit 15 in which the pedestal level of the luminance signal Y is clamped at a constant level. The clamped luminance signal Y is then supplied to a slice circuit 6 which removed the standard horizontal synchronizing pulses HD, and the luminance signal Y, without the horizontal synchronizing pulses HD, is applied to a mixer circuit 17.

Meanwhile, the luminance signal Y is also applied from the amplifier 13 to a horizontal synchronizing signal separator 18 which provides the horizontal synchronizing pulse HD to a timing signal generator 19. A timing signal coincident with the leading edge of the standard horizontal synchronizing pulse HD is provided to a narrow synch pulse generator 20 which produces narrow, foreshortened pulses $HD_N$ of 2 $\mu$sec pulse width, as shown in FIG. 4A. The foreshortened synchronizing pulses $HD_N$ are then applied to the mixer circuit 17 to be inserted in the luminance signal in place of the standard synchronizing pulses HD. Thus, the mixer circuit 17 provides a luminance signal $Y_N$ in which the standard horizontal synchronizing pulses HD and the standard back porch intervals are replaced by a foreshortened horizontal synchronizing pulses $HD_N$ followed by elongated back porch intervals of 7.2 $\mu$sec.

A video pre-emphasis circuit 21 applies to the luminance signal $Y_N$ a degree of pre-emphasis which is appropriate to the reduction of noise in the recorded luminance signal. The pre-emphasized video signal is then furnished to a combining circuit 22, and thence to a frequency modulator 23 where the signal is frequency modulated and applied to a chrominance combining circuit 24.

The chrominance component C of the composite video signal proceeds from the separator 14 to a frequency converter 25 which converts the carrier frequency of the chrominance signal C from a standard frequency of 3.5 MHz to a lower frequency of, for example, 688 KHz. The chrominance signal thus converted to a low frequency band is supplied to the combining circuit 24 to be mixed with the frequency modulated luminance signal $Y_N$. The composite color video signal formed of the frequency modulated luminance signal $Y_N$ and the frequency converted luminance component C is supplied to a recording amplifier 26 to be recorded on video tape by a rotary magnetic head 27.

At the same time, the left- and right-channel audio signals proceed from the input terminals 12L and 12R to respective audio amplifiers 31L and 31R, and thence to respective compression circuits 32L and 32R. The latter circuits serve to compress the dynamic range of the left and right channel audio signals such that when the level of the input signal is low, the quantization interval will be fine and any quantizing error will be small, and so that when the level of the input signal is high, the quantization interval will become coarse, and any corresponding quantizing error will be relatively large. However, because the large quantizing errors occur when the audio signal is relatively loud, such errors will be less noticeable.

The audio signals so compressed proceed to composers or mixer circuits 33L and 33R, respectively. A dither generator 34 provides a dither signal to the mixer circuits 33L and 33R to be respectively added to the compressed audio signals. This dither signal serves to improve the signal-to-noise ratio by dispersing quantization noise throughout the audio spectrum so that the quantization noise will be less noticeable. The left- and right-channel audio signals then proceed through respective low pass filters 35L and 35R to respective sample-and-hold circuits 36L and 36R. The timing signal generator 19 provides the left-channel sampling pulse $SP_L$ (FIG. 4B) at the onset of each horizontal interval, and also provides a right-channel sampling pulse $SP_R$ (FIG. 4C) at the beginning of the second half of each horizontal interval. These signals $SP_L$ and $SP_R$ are respectively provided to the sample-and-hold circuits 36L and 36R so that the latter sample the respective left- and right-channel audio signals once during each horizontal interval. Consequently, the low-pass filters 35L and 35R should have their rioll-off frequencies selected so as to eliminate frequencies greater than one half the horizontal frequency (i.e., frequencies greater than about 8 KHz).

The sample-and-hold circuits 36L and 36R have outputs connected to respective inputs of a switch 37 which is supplied with a switching signal $S_{LR}$ (FIG. 4D) from the timing signal generator 19. This switching signal $S_{LR}$ is high during the first half of each horizontal interval, and is low during the second half thereof, so that the switch 37 is coupled to the left-channel sample-and-hold circuit 36L during the first half of each horizontal interval, and is connected to the right-channel sample-and-hold circuit 36R during the second half of each horizontal interval. The sampled outputs of the sample-and-hold circuits 36L and 36R are then provided sequentially from the switch 37 to an analog-to-digital converter 38 which converts these outputs to parallel data words of eight bits. A parallel-to-serial converter 39 converts the data words from the converter 38 to serial form and furnishes the serial words to an error-correction encoder 40. In the latter, a cyclical redundancy check code (CRCC) of fifteen bits is formed for error correction and is added to the eight bits of the left-channel data word and the eight-bit of the right-channel data word to produce an error-correction data block of 31 bits, as shown in FIG. 2C, which can then be inserted on the elongated back porch portion of the luminance signal $Y_N$. However, before this is done, a record signal forming circuit 400 interleaves the data block of 31 bits with corresponding bits of other data blocks so that burst errors, such as those which result from data drop out, can be compensated for upon playback. To accomplish this, the record signal forming circuit 400 includes a bus switch 31 coupled to the error correction encoder 40, a random access memory (RAM) 42, a control circuit 43 providing a control signal $S_{RW}$ (FIG. 4E) to the data bus and an address signal to the RAM 42, and a gate circuit 45 to control the application of clock pulses to the shift register 44.

During the first half of each horizontal interval, when the control signal $S_{RW}$ is high, the bus switch 41 couples the error-correction encoder 40 to the RAM 42 and a 31-bit error correction data block is written into a particular memory address in the RAM 42. Then, during the second half of the horizontal interval, when the control signal $S_{RW}$ is low, the bus switch 41 couples the RAM 42 to a data input of the shift register 44. At this time, the address signal from the control circuit 43 is cyclically varied, so that the digital signal read out from the RAM 42 comprises a 31-bit error correcting data block in bit-interleaved form.

It is convenient, for example, to use a bit interleaved length of eight horizontal periods. Thus, in this example, in order to complete an interleaved cycle of the digital signal of 31 bits, $31 \times 8 = 248$ horizontal intervals are required.

Also, during the second half of each horizontal S period when the 31-bit interleaved error correction data block is read out from the RAM 42, a control signal $S_{IO}$ (FIG. 4F) from the control circuit 33 causes the gate circuit 35 to supply a write-in clock pulse of frequency $f_1$ to the shift register 44 so that the 31-bit data block is gathered therein.

Figure 4G:
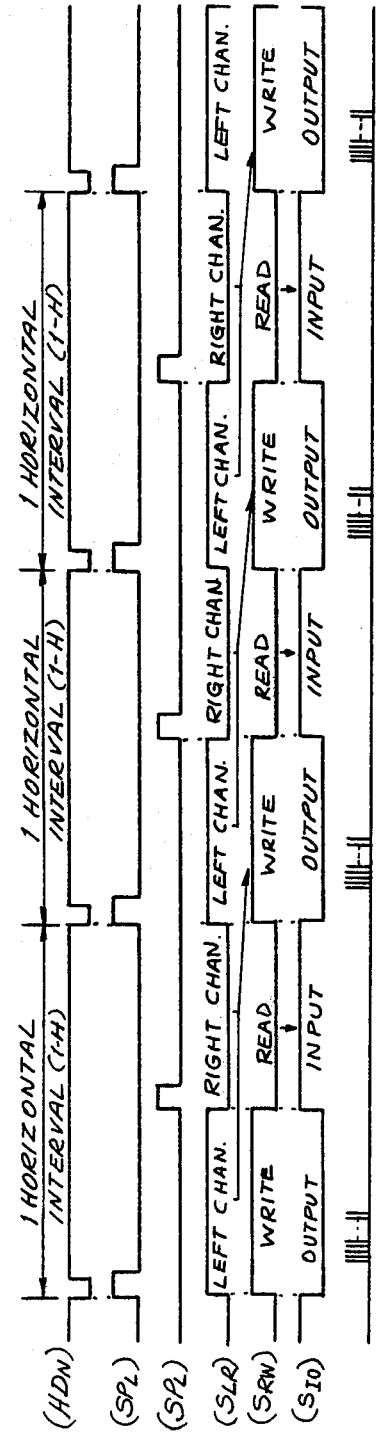

In the first half of the next subsequent horizontal interval, the control signal $S_{IO}$ causes the gate circuit 45 to supply read out clock pulses of frequency $f_2$ to the shift register 44. Here, the read-out clock frequency $f_2$ is selected so that 31 clock pulses thereof occur during the extended back porch interval of 7.2 $\mu$sec (FIG. 4G).

From the shift register 44, the data blocks are provided as a pulse code modulated signal to a PCM pre-emphasis circuit 46 which provides the PCM signal with an amount of pre-emphasis suitable for recording and playback of the PCM signal. Then, the pre-emphasized PCM signal is applied to the combining circuit 22 to be inserted in the luminance signal $Y_N$ during the extended back porch portion of the horizonal blanking intervals thereof.

Figure 5:
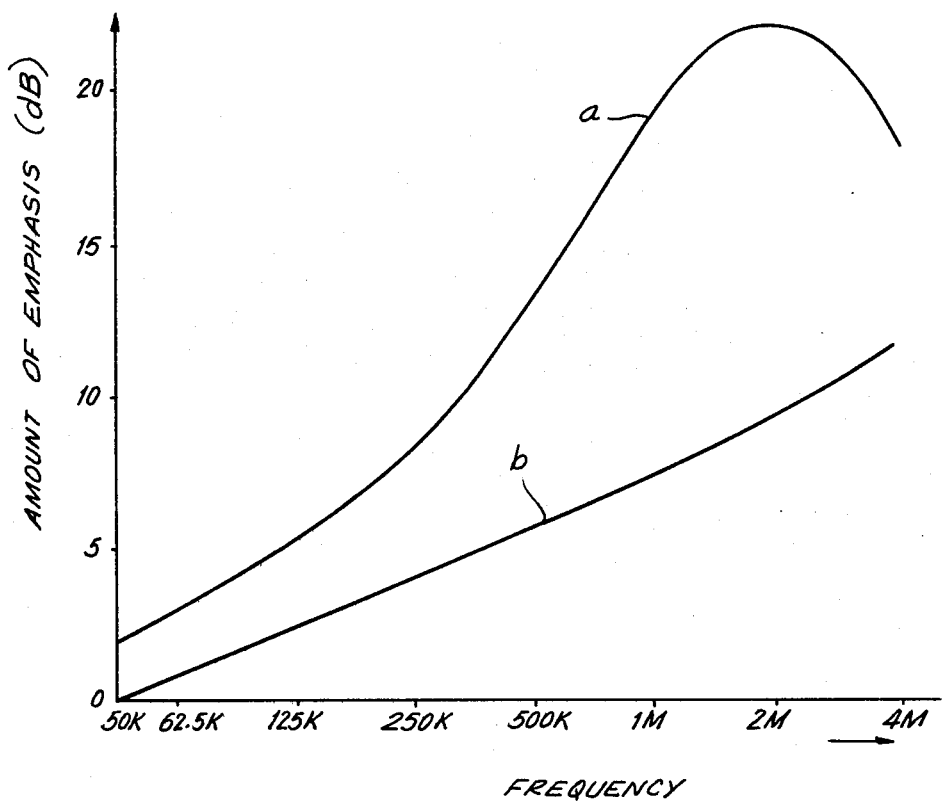
FIG. 5 is a characteristic graph for explaining pre-emphasis carried out according to this invention.

According to this invention, the luminance signal $Y_N$ and the PCM signal are provided with separate and independent degrees of pre-emphasis. For example, in this embodiment, the video pre-emphasis circuit 21 provides nonlinear pre-emphasis as shown by the solid line a in FIG. 5. In this instance, a pre-emphasis of 22.5 dB is provided at 2 MHz. On the other hand, the PCM pre-emphasis circuit 46 provides a linear pre-emphasis as illustrated by the solid line b in FIG. 5, which, at the frequency 2 MHz, is considerably smaller than the amount of pre-emphasis provided by the circuit 21.

Thus, the video recording head 27 records in the slant tracks on the magnetic tape a combined signal in which the PCM signal containing two audio channels is superimposed on the video signal in the extended back porch portions of the horizontal blanking intervals thereof.

Figure 6:
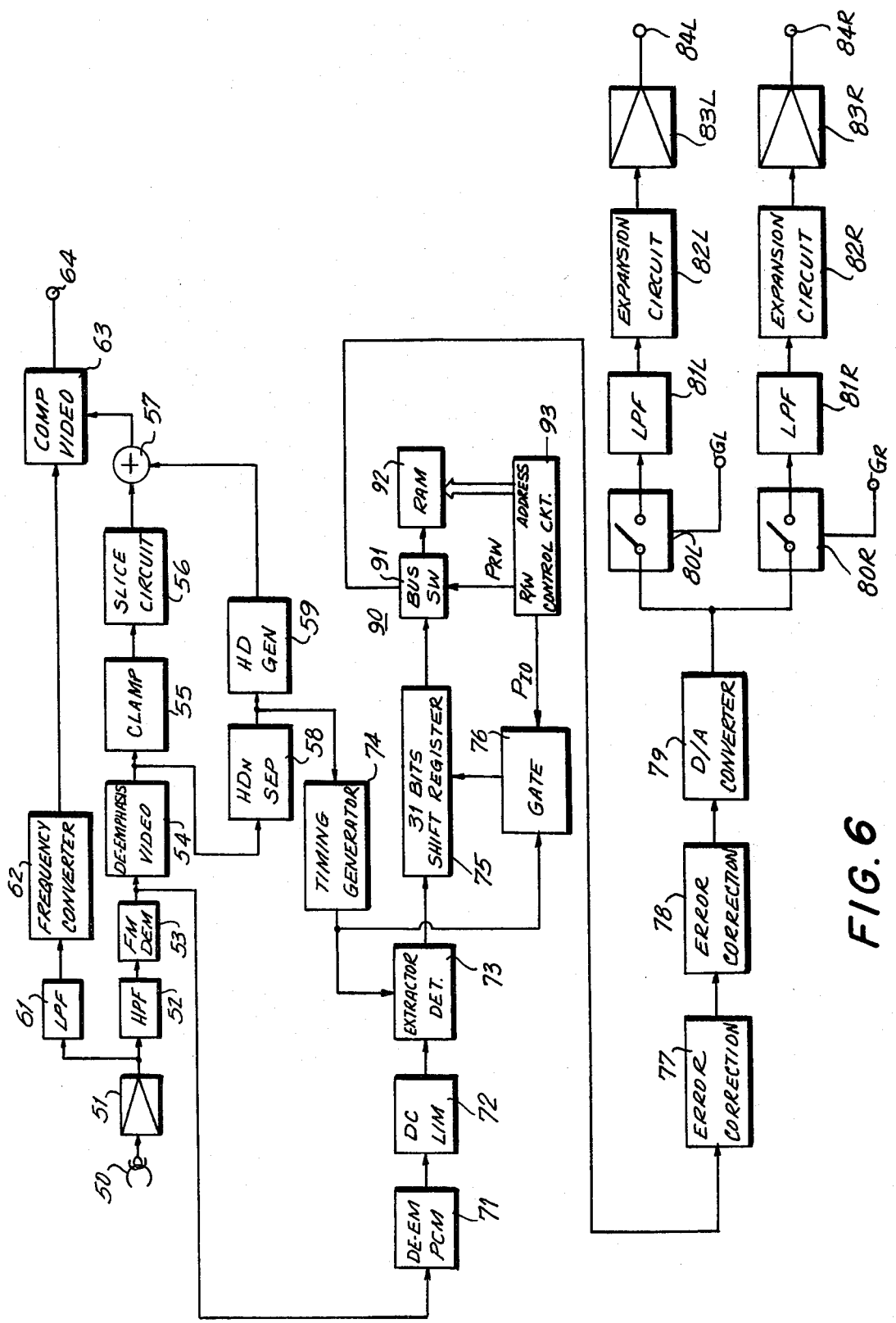
FIG. 6 is a schematic block diagram illustrating one embodiment of reproducing apparatus according to this invention.

FIG. 6 illustrates complementary reproducing apparatus for reproducing the video signal and extracting from the extended back porch portions of the horizontal blanking intervals thereof the PCM data containing the two audio channels.

As shown in FIG. 6, a rotary video pick-up head 50 picks up the signal recorded in the video tracks on the tape, and provides the picked-up video signal to a video head amplifier 51. The frequency modulated luminance signal $Y_N$ is provided through a high-pass filter 52, to an FM demodulator 53. Then the demodulated luminance signal $Y_N$ is processed in a video de-emphasis circuit 54 which provides an amount of de-emphasis complementary to the pre-emphasis provided by the pre-emphasis circuit 21 prior to recording. A clamp circuit 55 clamps the pedestal level of the luminance signal $Y_N$ to a predetermined voltage, and a slice circuit 56 eliminates the foreshortened synchronizing pulses $HD_N$ therefrom. Then the luminance signal $Y_N$ without synchronizing pulses $HD_N$ is applies to an adder 57.

At the same time the de-emphasized luminance signal $Y_N$ is applied to a synch signal separator 58 which is coupled to a synch signal generator 59. The latter, in response to leading edges of the foreshortened synchronizing pulses $HD_N$ provides to the adder 57 standard synchronizing pulses HD to be inserted in the horizontal blanking intervals of the luminance signal.

The frequency-converted chrominance component is provided from the head amplifier 51 through a low pass filter 61 to a frequency converter 62, which restores the carrier frequency of the chrominance component to its standard frequency, e.g., 3.58 MHz. Then an adder circuit 63 combines the luminance signal Y from the adder 57 with the chrominance component C from the frequency converter 62 to provide at a composite video output terminal 64 a standard color video signal.

The PCM digital audio signal carried in the extended back porch portions of the luminance signal $Y_N$ proceeds from the FM demodulator 53 to a PCM deemphasis circuit 71 which imparts a degree of de-emphasis complementary to that furnished by the pre-emphasis circuit 46 of FIG. 3.

The signal so de-emphasized proceeds to a DC limiter 72 which serves to shape the PCM waveform, and thence to a data extracting circuit 73. A timing signal generator 74 coupled to the synch signal separator 58 provides a gating signal commencing with the trailing edge of the foreshortened synchronizing pulses $HD_N$ (FIG. 7A) to the data extracting circuit 73, and in response, the latter furnishes the 31-bit data block $D_P$ (FIG. 7B) to a 31-bit shift register 75. A gate circuit 76 receives timing pulses from the timing generator 74 and a control signal $P_{IO}$ (FIG. 7C) from a de-interleaver circuit 90 to be described later. The control signal $P_{IO}$, which is low during the first half of each horizontal interval permits the 31 bits of the data block $D_P$ to be introduced into the shift register 75. Thereafter, during the second half of each horizontal interval, when the control signal $P_{IO}$ is high, the 31 bits are read out of the shift register 75 into the de-interleaver circuit 90 where they are de-interleaved and restored to their original error-correction blocks, and thereafter are furnished to an error-correction decoder 77. A read/write control signal $P_{RW}$ (FIG. 7D) is high during the second half of each horizontal interval to permit the 31 bits from the shift register 75 to be written into the deinterleaver 90 and is low during the subsequent first half of the horizontal intervals, during which the de-interleaved 31-bit signal is furnished therefrom to the error-correction decoder 77.

The error-correction decoder 77 is set into syndrome and error-mode states, as shown in FIG. 7E. That is, during the first half of each horizontal interval during which the de-interleaved data blocks are furnished thereto from the de-interleaved circuit 90, error syndromes are formed from the eight bits of the left channel word and from the eight bits of the right channel word. Then, in the subsequent half of each horizontal interval, error correction is carried out utilizing the CRC code and the error-correction syndromes so constructed.

Because certain errors are so severe that they cannot be completely corrected by the error-correction decoder 77, the PCM signal is furnished therefrom to an error concealing circuit 78, where an interpolation or mean-value operation is carried out to conceal uncorrectable errors. The operation of this error concealing circuit 78 can be explained with reference to FIG. 7F. The PCM data blocks from the error-correction decoder 77 consist of 8-bit words of the left channel signal alternating with 8-bit words of the right channel signal in such a manner that the words of the left channel signal occur during the first half of each horizontal period with the words of the right channel signal occurring in the second half thereof. The error concealing circuit 78 stores the 8-bit word for each of the left and right channel signals, and, if the subsequent corresponding left or right channel 8-bit word is determined to contain uncorrectable errors, a synthetic 8-bit data word is created by calculating the mean value of the 8-bit words of the same channel immediately preceding and immediately following the word containing uncorrectable errors.

The PCM digital signal is then furnished to a digital-to-analog convertor 79 which converts the digital words thereof to analog form whenever a signal DAC (FIG. 7G) provided thereto is at a high level. The analog signal from the converter 79 proceeds to left channel and right channel switching circuits 80L and 80R. These switching circuits respectively receive switching signals $G_L$ (FIG. 7H) and $G_R$ (FIG. 7I) which are high during alternate occurrences of the signal DAC. Consequently the analog left and right channel signals are furnished to respective low pass filters 81L and 81R having a cut-off frequency below the rate of the switching signals $G_L$ and $G_R$, and thence to respective expansion circuits 82L and 82R in which the original dynamic range is restored to the audio signal. The left- and right-channel audio signals are then provided through amplifiers 83L and 83R to output terminals 84L and 84R.

Returning to the de-interleaver circuit 90, it will become apparent that the construction thereof is complementary to that of the record-signal forming circuit 400 of FIG. 3. In the de-interleaver circuit 90, a bus switch 91, in response to the signal $P_{RW}$, couples a random access memory (RAM) 92 to the error-correction decoder 77 during the first half of each horizontal interval, and couples the shift register 75 to the RAM 92 during the second half of each such horizontal interval. A control circuit 93 furnishes the signal $P_{RW}$ to the bus switch, furnishes the signal $P_{IO}$ to the gate circuit 76, and furnishes address signals to the RAM 92 so that the disbursed bits of the data words written into the RAM 92 are restored to their original error-correction blocks when read out therefrom.

Figure 8:
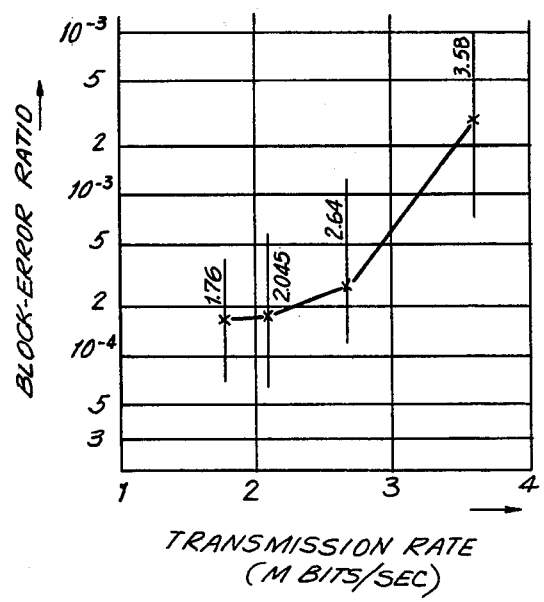
FIG. 8 is a characteristic graph of error rate versus bit rate for recording PCM signals, which is used in explaining an advantage of this invention.

FIG. 8 is a chart showing typical error rates for a PCM audio signal recorded and reproduced on a rotary-head home-use VTR. In this connection, it is noted that for such home-use VTRs, the upper limit to the transmission rate is typically 2.6 to 2.8 M bit/sec. Also, at 4 M bit/sec, the error rate is as high as $1 \times 10^{-2}$. In contrast to this, with the apparatus according to this invention, the error rate at 4 M bit/sec has been measured at only $1 \times 10^{-3}$, which is far superior to that conventional similar apparatus.

Consequently, in a home-use VTR, where high-density recording and long play are extremely desirable, this invention is especially applicable because the audio signal can be converted to a PCM signal which can be reliably reproduced upon playback as a high fidelity audio signal.

In the above-described embodiments, as the foreshortened synchronizing pulse $HD_N$ is substituted for the standard synchronizing pulse HD in order to enlarge the back porch portion of the horizontal blanking interval, the PCM data can be recorded and reproduced under optimum conditions such that the frequency characteristic and the signal-to-noise ratio are both sufficiently high.

While in the above-described embodiments, there are provided different pre-emphasis circuits for the video signal and for the PCM data to provide respective degrees of emphasis thereto, it is also possible that a single pre-emphasis circuit could be used in which the emphasis characteristic thereof is changeable. That is, a single pre-emphasis circuit (and a corresponding single de-emphasis circuit) could be used in which one degree of emphasis is provided during those portions of the video signal containing video information, while another degree of emphasis is provided during those portions of the video signal containing PCM data only.

In addition to the substitution of the foreshortened synchronizing pulse $HD_N$ for the standard synchronizing pulse HD, it also possible to move the foreshortened synchronizing pulse $HD_N$ into the position normally occupied by the front porch portion of the horizontal blanking interval. This would provide a further-enlarged back porch portion in which still further PCM data bits can be inserted.

While a particular embodiment of the recording and the reproducing apparatus according to this invention have been described above in detail, it should be apparent that the invention is not limited to such precise embodiments, and many variations and modifications thereof can be effected by those skilled in the art without departure from the scope and spirit of this invention, as defined in the appended claims.

We claim:

1. A method of transmitting a video signal containing regularly spaced blanking intervals alternating with video information intervals containing video information, with pulse code modulated digital information being inserted in a portion of each of said blanking intervals, comprising:
    emphasizing said video information with one amount of preemphasis;
    emphasizing said digital information with another amount of preemphasis independent of the first-mentioned amount of preemphasis;
    inserting the preemphasized digital information into said portions of the blanking intervals to form a combined video signal; and
    transmitting said combined video signal on a carrier.

2. A method of transmitting a video signal according to claim 1, wherein said spaced blanking intervals each normally contain a synchronizing pulse of a standard width followed by a back porch portion of a standard width, and said step of inserting includes replacing said synchronizing pulse and back porch portion of standard width with a narrow synchronizing pulse of lesser width followed by an extended back portion of greater width, and inserting said digital information into said extended back porch portion.

3. A method of transmitting a video signal according to claim 1, further comprising picking up said resulting signal; separating said digital information from said video information; and applying respective amounts of deemphasis to said video signal and to said digital signal, said amounts being complementary to said one amount and to said other amount, respectively.

4. A method of transmitting a video signal according to claim 1, wherein said digital information is formed by receiving and sampling an analog signal at a rate of at least one sample for each video information interval, and converting each sample of said analog signal into a plural-bit digital data word; and said step of inserting includes placing said plural-bit data words into said blanking intervals.

5. A method of transmitting a video signal according to claim 4, wherein said converting further includes error-correction encoding said digital data words by forming corresponding plural bit check words and interleaving the bits of said digital data words and check words among a plurality of said digital data words to form transmission data words.

6. A method of transmitting a video signal according to claim 5, wherein said converting further includes writing the interleaved transmission data words into a storage device at one rate during said video information intervals, and reading the stored transmission data words serially therefrom at another, faster rate during respective portions of said blanking intervals; and said step of emphasizing said digital information with preemphasis includes preemphasizing the transmission data words read out from said storage device.

7. Apparatus for recording a video signal constituted by periodic intervals formed of video information intervals containing video information separated by blanking intervals; comprising video signal processing circuit means for processing the video signal for recording including video preemphasis circuit means for imparting to said video information a first amount of preemphasis; digital information signal processing means for providing a digital signal to be inserted into said blanking intervals; digital information signal preemphasis circuit means for imparting to said digital signal a second amount of preemphasis independent of said first amount; combining circuit means for receiving the preemphasized video signal with said blanking intervals and inserting the preemphasized digital signal from said digital information signal preemphasis circuit means into said blanking intervals to form a combined video signal; and recording means for recording said combined video signal on a record medium.

8. Apparatus for recording a video signal according to claim 7, wherein said blanking intervals each normally contain a synchronizing pulse of a standard width followed by a back porch portion of a standard width, and said video signal processing circuit means includes means for replacing each said synchronizing pulse and back porch portion of a standard width with a narrow synchronizing pulse of lesser width than said synchronizing pulse of said standard width followed by an extended back porch portion of greater width than said back porch portion of said standard width.

9. Apparatus for recording a video signal according to claim 8, wherein said digital information signal processing means includes data buffer means for receiving and storing data words of said digital signal and intermittently providing said data words so as to substantially occupy the extended back porch portion of each said blanking interval.

10. Apparatus for recording a video signal according to claim 9, wherein said buffer means includes random storage means for receiving and storing said data words, control means for controlling the storage of said data words in said random storage means and selectively reading out said words stored therein, and shift register means for receiving said words in serial form from said random storage means and providing said words in serial form to said digital information signal preemphasis circuit means.

11. Apparatus for recording a video signal according to claim 10, wherein said buffer means further comprises timing signal gating means for providing to said shift register means first timing signals having a first rate when said data words are read out from said random storage means, and second timing signals having a second rate only during said extended back porch portions.

12. Apparatus for recording a video signal according to claim 8, wherein said digital information signal is formed from a two-channel audio signal, and said digital information signal processing means includes sampling means for sampling one channel thereof during one portion of each of said periodic intervals, and for sampling another channel thereof during a subsequent portion of each of said periodic intervals, to provide first and second signal samples representing values of the respective channels during said periodic intervals.

13. Apparatus for recording a video signal according to claim 12, wherein said digital information signal proessing means includes means for providing said first and second signal samples alternately; means for converting said samples to sequential digital data words, and means for encoding said sequential data words for error correction.

14. Apparatus for recording a video signal according to claim 13, wherein said means for encoding said sequential data words for error correction provides a check word generated from said sequential digital data words, and then interleaves bits of the digital data words and check words among a plurality of groups of said sequential digital data words and associated check words.

15. Apparatus for reproducing a combined video signal recorded on a record medium and constituted by periodic intervals formed of video information intervals containing video information separated by blanking intervals, a predetermined portion of each of which contains a digital information signal inserted therein prior to recording, comprising pick up means for picking up said combined video signal from said medium; video signal pathway means including video deemphasis means for imparting a first amount of deemphasis to said video information, and video output means for providing a so-deemphasized signal containing said video information; digital information signal pathway means including digital information deemphasis means for imparting to said digital information signal a second amount of deemphasis independent of said first amount, and signal conversion means for converting the so-deemphasized digital information signal to an output information signal.

16. Apparatus for reproducing a combined video signal according to claim 15, wherein each said blanking interval is formed of a foreshortened synchronizing pulse followed by an elongated back porch portion containing said digital information signal, and said video output means includes means for replacing said foreshortened synchronizing pulse and elongated back porch portion with a standard synchronizing pulse of greater width than said foreshortened synchronizing pulse followed by a standard back porch portion of lesser width than said elongated back porch portion.

17. Apparatus for reproducing a combined video signal according to claim 15, wherein said signal conversion means includes timing generator means for providing a timing signal during each said predetermined portion of said blanking intervals; extractor means for extracting said digital information signal in response to said timing signal; means for receiving the extracted digital information signal during said predetermined portion and during a following video information interval providing said extracted digital information signal; and digital signal processing means for converting said extracted digital information signal to said output information signal.

18. Apparatus for reproducing a combined video signal according to claim 17; wherein said digital information signal is recorded as interleaved groups of sequential digital data words and error correction check words associated therewith, and said digital signal processing means includes deinterleaving means for deinterleaving the sequential digital data words and error correction check words, and error correction decoder means for correcting errors occurring in the deinterleaved sequential digital data words on the basis of said error correction check words.

19. Apparatus for reproducing a combined video signal according to claim 18; wherein said sequential digital data words include alternate left-channel words and right-channel words, and said digital signal processing means includes means for converting said left- and right-channel words to analog form and analog signal processing means for providing respective left- and right-channel audio signals as said output information signal.

* * * * *